(12) United States Patent
Hwang et al.

(10) Patent No.: US 9,664,794 B2
(45) Date of Patent: May 30, 2017

(54) APPARATUS AND METHOD FOR MONITORING MALFUNCTIONING STATE OF GLOBAL POSITIONING SYSTEM (GPS) SATELLITE

(75) Inventors: Yoo La Hwang, Daejeon (KR); Byoung Sun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1314 days.

(21) Appl. No.: 13/561,559

(22) Filed: Jul. 30, 2012

(65) Prior Publication Data

US 2013/0088387 A1    Apr. 11, 2013

(30) Foreign Application Priority Data

Oct. 7, 2011    (KR) .................. 10-2011-0102315

(51) Int. Cl.
*G01S 19/20* (2010.01)
*G01S 19/08* (2010.01)
*G01S 19/07* (2010.01)

(52) U.S. Cl.
CPC .............. *G01S 19/20* (2013.01); *G01S 19/08* (2013.01); *G01S 19/07* (2013.01)

(58) Field of Classification Search
CPC ........... G01S 19/20; G01S 19/07; G01S 19/08
USPC .......................... 342/357.58, 357.45, 357.44
See application file for complete search history.

(56) References Cited

U.S. PATENT DOCUMENTS

| 5,600,329 | A | * | 2/1997 | Brenner | G01S 5/009 340/979 |
| 5,969,672 | A | * | 10/1999 | Brenner | G01S 19/20 342/357.29 |
| 6,134,484 | A | * | 10/2000 | Geier | H04B 7/18519 342/357.29 |
| 6,847,893 | B1 | | 1/2005 | Lupash | |
| 6,856,905 | B2 | * | 2/2005 | Pasturel | G01S 19/20 342/357.29 |
| 7,095,369 | B1 | * | 8/2006 | Clark | G01S 19/02 342/357.58 |
| 7,840,351 | B2 | * | 11/2010 | Hwang | G01S 19/07 701/478.5 |
| 8,456,353 | B2 | * | 6/2013 | Dai | G01S 19/41 342/357.24 |
| 8,972,184 | B2 | * | 3/2015 | Hwang | G01S 19/42 455/13.1 |

(Continued)

FOREIGN PATENT DOCUMENTS

KR    1020070057649 A    6/2007

*Primary Examiner* — Chuong P Nguyen
(74) *Attorney, Agent, or Firm* — William Park & Associates Ltd.

(57) ABSTRACT

Provided is an apparatus for monitoring a malfunctioning state of a global positioning system (GPS) satellite, the apparatus comprising: an orbit computing unit to compute an orbit of a geostationary satellite; a data receiver to receive GPS data from the GPS satellite; a data correction unit to correct an error in a clock error value of the GPS data; a first computing unit to compute a data pseudorange between the GPS satellite and a base station based on the corrected GPS data; a second computing unit to compute a geographical distance between the GPS satellite and the base station; and a determining unit to determine a malfunctioning state of the GPS satellite by comparing the data pseudorange and the geographical distance.

17 Claims, 4 Drawing Sheets

(56) References Cited

U.S. PATENT DOCUMENTS

| | | | | |
|---|---|---|---|---|
| 2011/0169693 A1* | 7/2011 | Trautenberg | ............ | G01S 19/08 342/357.58 |
| 2014/0240171 A1* | 8/2014 | Cho | ........................ | G01S 19/13 342/357.51 |

* cited by examiner

APPARATUS AND METHOD FOR MONITORING MALFUNCTIONING STATE OF GLOBAL POSITIONING SYSTEM (GPS) SATELLITE

CROSS-REFERENCE TO RELATED APPLICATION

This application claims the priority benefit of Korean Patent Application No. 10-2011-0102315, filed on Oct. 7, 2011, in the Korean Intellectual Property Office, the disclosure of which is incorporated herein by reference.

BACKGROUND

1. Field of the Invention

Embodiments of the present invention relates to an apparatus and method for monitoring a malfunctioning state of a global positioning system (GPS) using a geostationary satellite.

2. Description of the Related Art

A base station may receive a global positioning system (GPS) signal in real time from a GPS satellite, and thereby verify a position of a receiver holding a GPS receiver.

A geostationary satellite revolves around the Earth at the same rotation velocity of the earth that rotates once a day. Therefore, when viewing the geostationary satellite from the earth, the geostationary satellite is positioned at the same point at all times. Using features of a satellite, a satellite control center locates satellites for communication, broadcasting, and weather observation in such geostationary orbit and thereby operates the satellites.

An orbit of a general geostationary satellite may be determined using measurement data and distance measurement data that may be obtained using a tracking antenna installed in a satellite control center.

In general, the orbit of the geostationary satellite may be determined based on data that may be obtained from a single tracking antenna in order to minimize the man power, resources, and efforts used for satellite control.

A GPS signal may be received in real time to verify a position of a receiver, and may be generally used for a satellite navigation system such as an airplane or a vehicle. When a position of a receiver is not verified due to a malfunction in transmission and reception of a GPS signal, the satellite navigation system may provide false information.

The satellite navigation system may need to receive a precise and accurate GPS signal in order to prevent a malfunctioning state, and may also need to receive a reliable GPS signal in order to prevent disturbance or interference.

To enforce a satellite navigation system and a geostationary satellite, there is a need to increase the accuracy of an orbit of the geostationary satellite through synchronization of a clock using the geostationary satellite and data of an external base station.

According to an increase in the orbit accuracy of a geostationary satellite, a current satellite navigation system may verify an accurate position of the geostationary satellite and may provide an accurate position of a GPS receiving base station, and may also compute an accurate distance from the geostationary satellite to a GPS satellite.

SUMMARY

According to an aspect of the present invention, there is provided an apparatus for monitoring a malfunctioning state of a global positioning system (GPS) satellite, the apparatus including: an orbit computing unit to compute an orbit of a geostationary satellite; a data receiver to receive GPS data from the GPS satellite; a data correction unit to correct an error in a clock error value of the GPS data; a first computing unit to compute a data pseudorange between the GPS satellite and a base station based on the corrected GPS data; a second computing unit to compute a geographical distance between the GPS satellite and the base station; and a determining unit to determine a malfunctioning state of the GPS satellite by comparing the data pseudorange and the geographical distance.

When a difference between the data pseudorange and the geographical distance is greater than a predetermined threshold used to determine a satellite malfunctioning state, the determining unit may determine that the GPS satellite is in the malfunctioning state.

The data correction unit may correct the GPS data by subtracting the clock error value from the GPS data.

According to another aspect of the present invention, there is provided a method of monitoring a malfunctioning state of a GPS satellite, the method including: computing an orbit of a geostationary satellite; receiving GPS data from the GPS satellite; correcting an error in a clock error value of the GPS data; computing a data pseudorange between the GPS satellite and a base station based on the corrected GPS data; computing a geographical distance between the GPS satellite and the base station; and determining a malfunctioning state of the GPS satellite by comparing the data pseudorange and the geographical distance.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
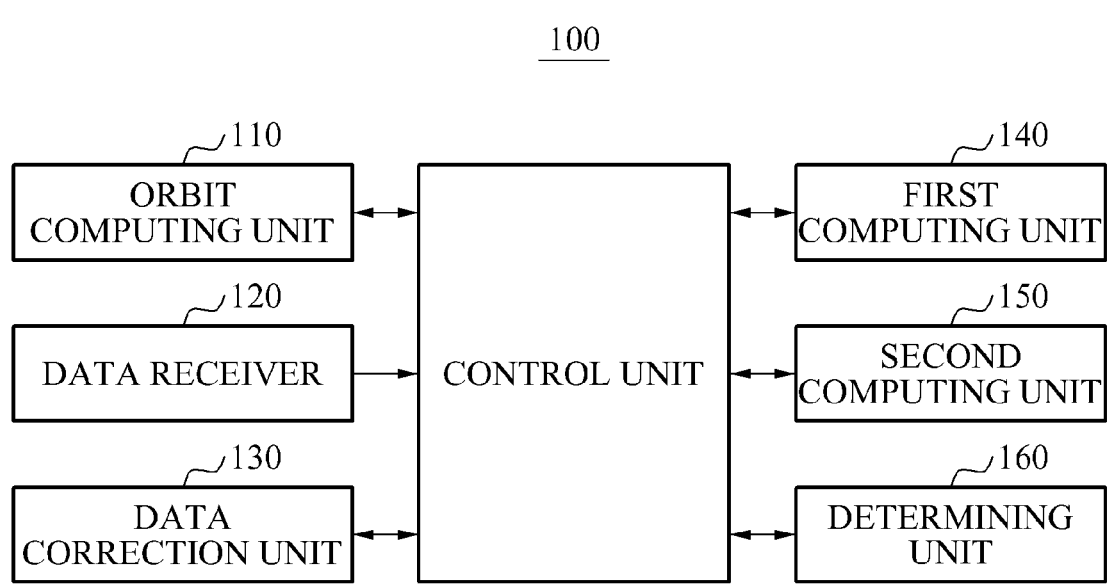
FIG. 1 is a block diagram illustrating a configuration of an apparatus for monitoring a malfunctioning state of a global positioning system (GPS) satellite according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus may be changed depending on a user, the intent of an operator, or a custom. Accordingly, the terminologies must be defined based on the following overall description of this specification.

FIG. 1 is a block diagram illustrating a configuration of an apparatus 100 for monitoring a malfunctioning state of a global positioning system (GPS) satellite according to an embodiment of the present invention.

Referring to FIG. 1, the apparatus 100 for monitoring a malfunctioning state of a GPS satellite may include an orbit computing unit 110, a data receiver 120, a data correction unit 130, a first computing unit 140, a second computing unit 150, and a determining unit 160.

Figure 2:
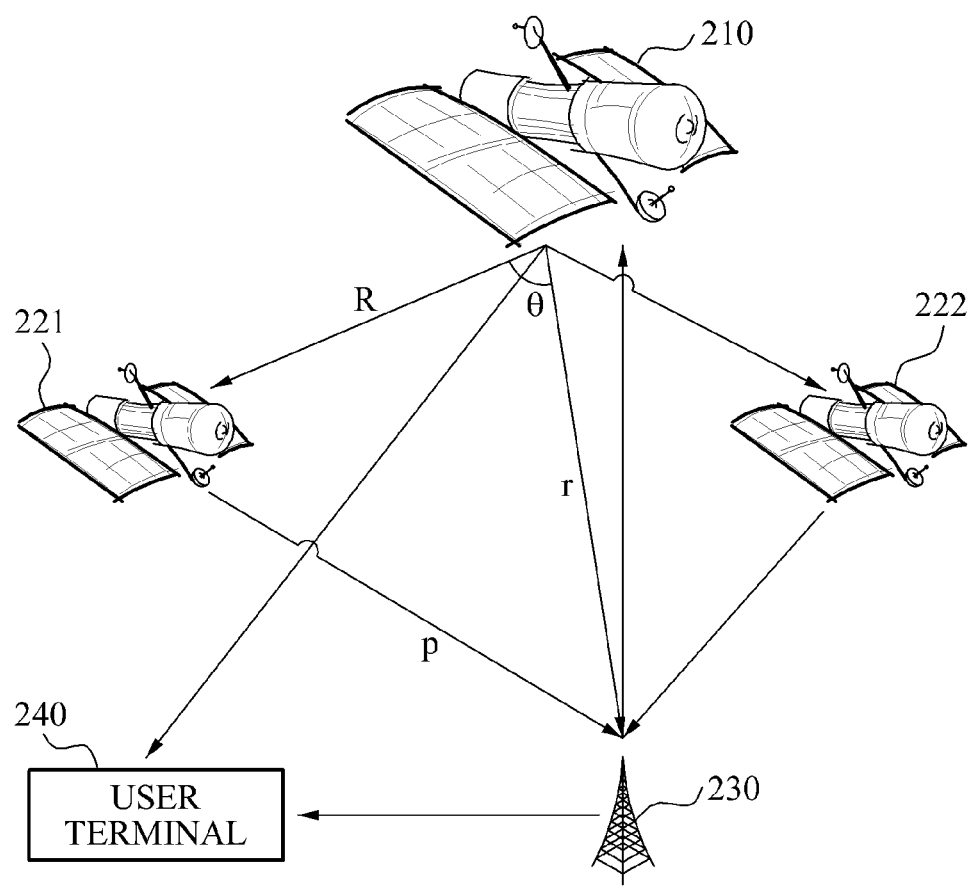
FIG. 2 is a diagram illustrating an example of a system for monitoring a malfunctioning state of a GPS satellite according to an embodiment of the present invention.

FIG. 2 is a diagram illustrating an example of a system for monitoring a malfunctioning state of a GPS satellite according to an embodiment of the present invention.

Referring to FIG. 2, the system for monitoring a malfunctioning state of a GPS satellite may include a geostationary satellite 210, at least one GPS satellite, for example, GPS satellites 221 and 222, and a base station 230.

The geostationary satellite 210 may be a satellite having a high accuracy in determining an orbit. The GPS satellites 221 and 222 may need to be visible from a GPS receiver of the base station 230.

Here, position coordinates of the geostationary satellite 210 may be expressed by $\vec{P}_{geo}=[X\ Y\ Z]$, position coordinates of the GPS satellite 221 may be expressed by $\vec{P}_{gps}=[x\ y\ z]$, and position coordinates of the GPS receiver of the base station 230 may be expressed by $\vec{P}_{rev}=[r_x\ r_y\ r_z]$.

Also, a distance vector from the geostationary satellite 210 to the GPS satellite 221 may be expressed by $\vec{R}=\vec{P}_{gps}-\vec{P}_{geo}$, and a distance vector from the geostationary satellite 210 to the GPS receiver of the base station 230 may be expressed by $\vec{r}=\vec{P}_{rev}-\vec{P}_{geo}$.

The GPS receiver of the base station 230 indicates an apparatus that may receive GPS data from a master ground station, and process the received GPS data.

The GPS receiver of the base station 230 may determine whether the GPS satellite is malfunctioning after processing the GPS data, and may transmit, to a user terminal 240, a result about whether the processed GPS data corresponds to a malfunctioning state.

The GPS receiver of the base station 230 may transmit GPS data to another base station or a master station, or may also directly transmit GPS data to the user terminal 240, or may transmit GPS data to the user terminal 240 via the geostationary satellite 210.

Figure 3:
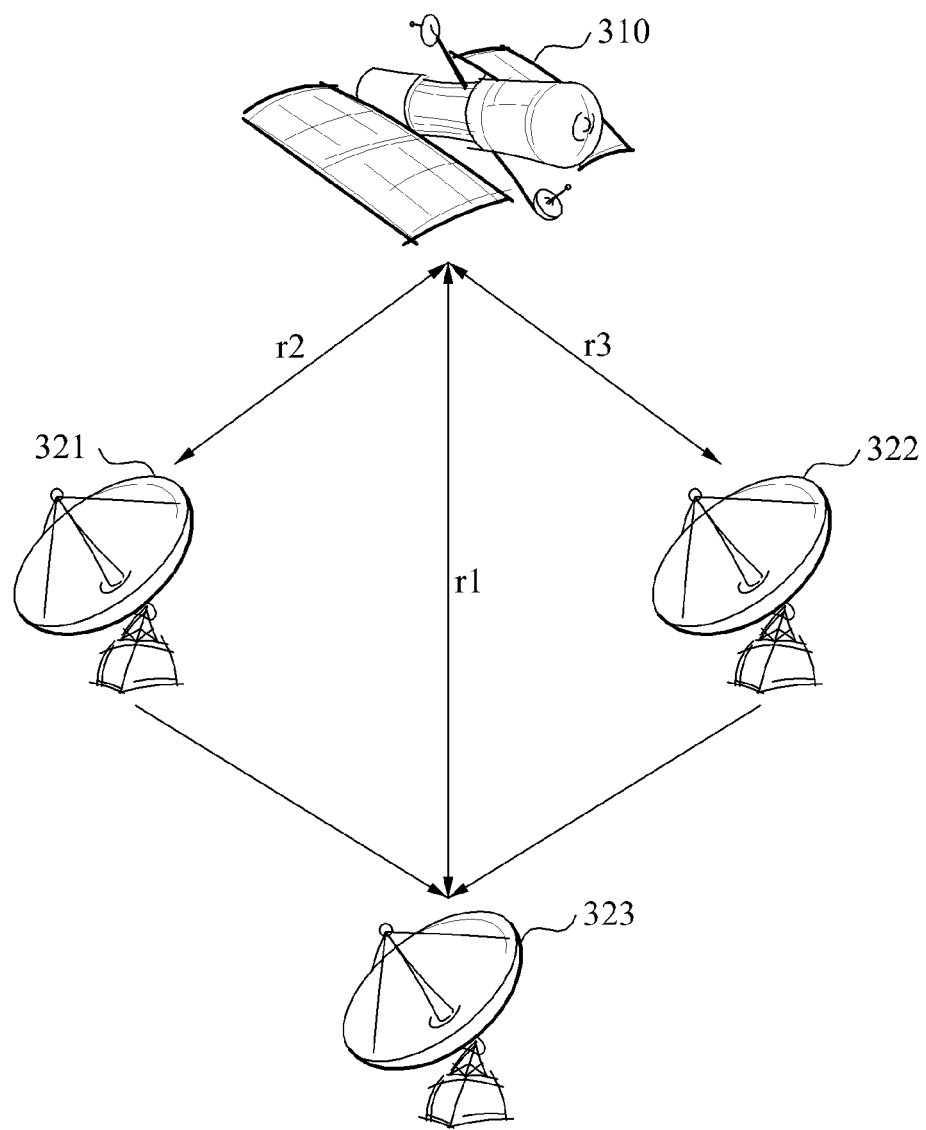
FIG. 3 is a diagram illustrating a system for precisely determining an orbit of a geostationary satellite according to an embodiment of the present invention.

FIG. 3 is a diagram illustrating a system for precisely determining an orbit of a geostationary satellite 310 according to an embodiment of the present invention.

The geostationary satellite 310 may receive ranging data of r1, r2, and r2 from ground stations 321, 322, and 323, respectively, and may determine a position of the geostationary satellite 310 based on the received ranging data.

When a system for monitoring a malfunctioning state of a GPS satellite determines an orbit by performing ranging using at least three ground station sites, a position vector of the geostationary satellite 310 may be accurately detected. An orbit of the GPS satellite may use GPS orbit information that is accurately provided from International global navigation satellite system (GNSS) services, or may predict previous accurate orbit information of a master station.

The apparatus 100 for monitoring a malfunctioning state of a GPS satellite may accurately detect a malfunctioning state of a GPS satellite in real time. Therefore, a method of detecting a malfunctioning state of a GPS satellite using the apparatus 100 for monitoring a malfunctioning state of a GPS satellite will be described in the following.

Figure 4:
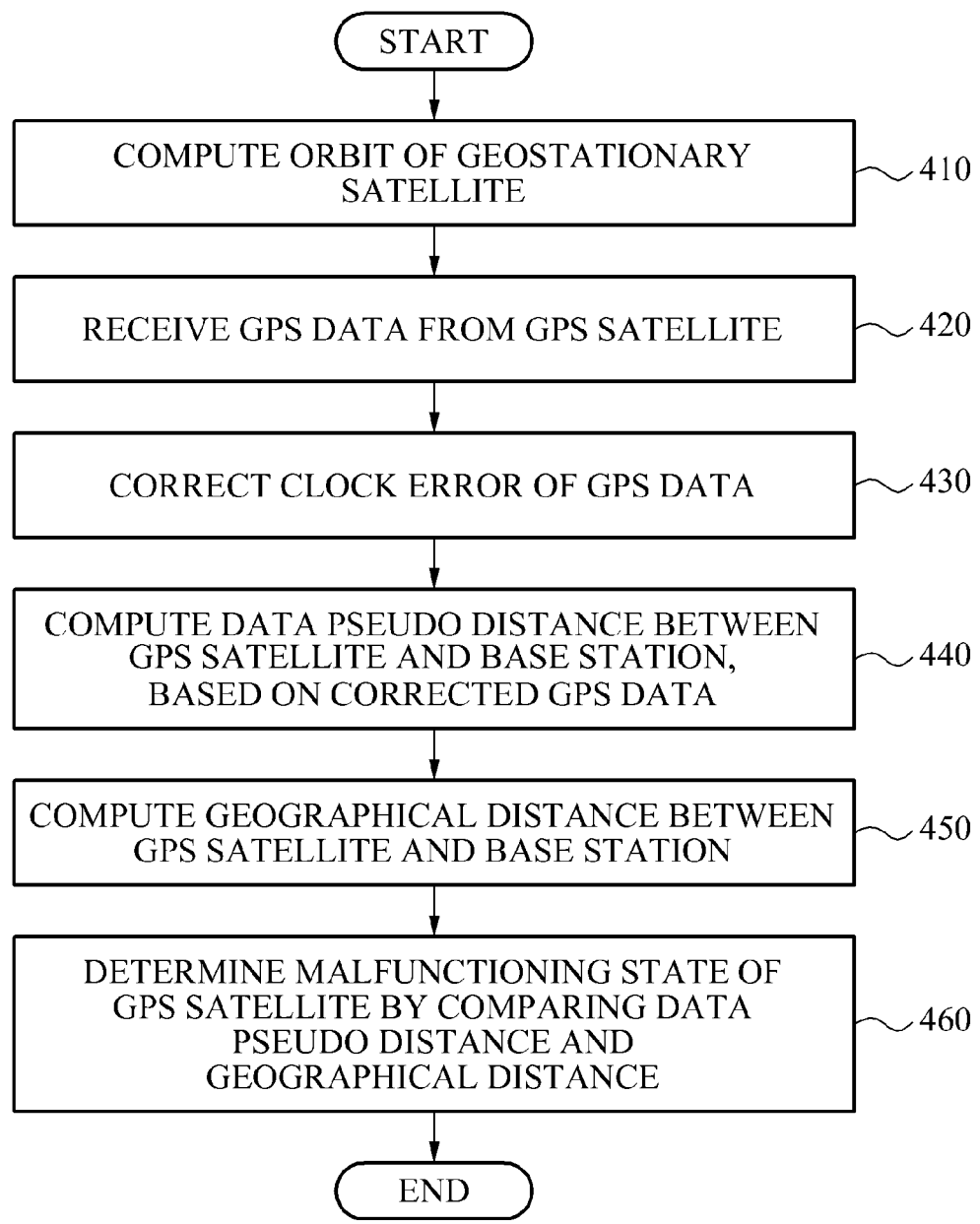
FIG. 4 is a flowchart illustrating a method of monitoring a malfunctioning state of a GPS satellite according to an embodiment of the present invention.

FIG. 4 is a flowchart illustrating a method of monitoring a malfunctioning state of a GPS satellite according to an embodiment of the present invention.

In operation 410, the apparatus 100 for monitoring a malfunctioning state of a GPS satellite may compute an orbit of the geostationary satellite 210 using the orbit computing unit 110.

In operation 420, the apparatus 100 for monitoring a malfunctioning state of a GPS satellite may receive GPS data from the GPS satellites 221 and 222 using the data receiver 120.

In operation 430, the apparatus 100 for monitoring a malfunctioning state of a GPS satellite may correct an error in a clock error value of GPS data using the data correction unit 130.

The data correction unit 130 may correct the GPS data by subtracting the clock error value from the GPS data.

A clock error may be computed using a GPS satellite clock error correction value that is predicted at an IGS site, a broadcast clock error correction value, or an error correction value that is predicted from previous data at a master ground station.

The clock error of the GPS receiver of the base station 230 may be corrected using a value that is directly estimated from pseudorange data received in real time, or a clock error that is estimated using a previous point in time.

In operation 440, the apparatus 100 for monitoring a malfunctioning state of a GPS satellite may compute a data pseudorange between the GPS satellite 221 and the base station 230 based on the corrected GPS data using the first computing unit 140.

The apparatus 100 for monitoring a malfunctioning state of a GPS satellite may compute a data pseudorange between the GPS satellite 222 and the base station 230 based on the corrected GPS data using the first computing unit 140. Hereinafter, for ease of description, a description will be made based on a relationship with the GPS satellite 221.

In operation 450, the apparatus 100 for monitoring a malfunctioning state of a GPS satellite may compute a geographical distance between the GPS satellite 221 and the base station 230 using the second computing unit 150.

The second computing unit 150 may compute a distance R from the geostationary satellite 210 to the GPS satellite 221 according to the following Equation 1:

$$|\vec{R}|=R=\sqrt{(X-x)^2+(Y-y)^2+(Z-z)^2} \quad \text{[Equation 1]}$$

Here, each of X, Y, and Z denotes a position coordinate value of the geostationary satellite 210, and each of x, y, and z denotes a position coordinate value of the GPS satellite 221.

The second computing unit 150 may compute a distance r from the geostationary satellite 210 to the base station 230 according to the following Equation 2:

$$|\vec{r}|=r=\sqrt{(X-r_x)^2+(Y-r_y)^2+(Z-r_z)^2} \quad \text{[Equation 2]}$$

Here, each of X, Y, and Z denotes a position coordinate value of the geostationary satellite, and each of $r_x$, $r_y$, and $r_z$ denotes a position coordinate value of the GPS receiver of the base station 230.

The second computing unit 150 may compute an included angle θ between the GPS satellite 221 and the base station 230 based on the geostationary satellite 210 according to the following Equation 3:

$$\cos\theta = \frac{\vec{R}\cdot\vec{r}}{|\vec{R}||\vec{r}|} \quad \text{[Equation 3]}$$

The second computing unit 150 may compute the geographical distance ρ according to the following Equation 4:

$$\rho = \sqrt{R^2 + r^2 - 2Rr\cos\theta} \quad \text{[Equation 4]}$$

The first computing unit 140 may compute the data pseudorange $\rho_{rec}^{sat}$ according to the following Equation 5:

$$\rho_{rec}^{sat} = c(t_{rec} - t^{sat} + \Delta t) \quad \text{[Equation 5]}$$

Here, c denotes the velocity of light, $t_{rec}$ denotes an amount of time used for the base station 230 to receive the GPS data, $t^{sat}$ denotes an amount of time used for the GPS satellite 221 to receive the GPS data, and Δt denotes a clock error to be corrected.

In operation 460, the apparatus 100 for monitoring a malfunctioning state of a GPS satellite may determine a malfunctioning state of the GPS satellite 221 by comparing the data pseudorange and the geographical distance using the determining unit 160.

When a difference between the data pseudorange and the geographical distance is greater than a predetermined threshold used to determine a satellite malfunctioning state, the determining unit 160 may determine that the GPS satellite 221 is in the malfunctioning state.

When the result obtained by subtracting the data pseudorange from the geographical distance is included in a threshold ρ as expressed by the following Equation 6, the determining unit 160 may determine that the GPS satellite 221 is in a normal state:

$$\sigma_{gps} = |\rho - \rho_{rec}^{sat}| < p \quad \text{[Equation 6]}$$

On the contrary, when the result obtained by subtracting the data pseudorange from the geographical distance is not included in the threshold ρ, the determining unit 160 may determine that the GPS satellite 221 is in a malfunctioning state.

The determining unit 160 may set the threshold as a maximum error range that includes at least one of an ionosphere error, a convection layer error, and a position error of the geostationary satellite 210.

According to embodiments of the present invention, it is possible to monitor a malfunctioning state of a GPS satellite signal and data in real time.

According to embodiments of the present invention, it is possible to quickly recover an error of GPS data by quickly providing a user with information regarding whether a GPS signal corresponds to a malfunctioning state.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for monitoring a malfunctioning state of a global positioning system (GPS) satellite, the apparatus comprising:
   a processor;
   a non-transitory, computer-readable media; and
   program instructions stored in the computer-readable media and executable by the processor, the program instructions defining units which include:
   an orbit computing unit to compute an orbit of a geostationary satellite;
   a data receiver to receive GPS data from the GPS satellite;
   a data correction unit to correct an error in a clock error value of the GPS data;
   a first computing unit to compute a data pseudorange between the GPS satellite and a base station based on the corrected GPS data;
   a second computing unit to compute a geographical distance between the GPS satellite and the base station; and
   a determining unit to determine the malfunctioning state of the GPS satellite by comparing the data pseudorange and the geographical distance,
   wherein the geographical distance between the GPS satellite and the base station is calculated using each of:
   a distance R from the geostationary satellite to the GPS satellite,
   a distance r from the geostationary satellite to the base station, and
   an included angle θ between the GPS satellite and the base station based on the geostationary satellite.

2. The apparatus of claim 1, wherein when a difference between the data pseudorange and the geographical distance is greater than a predetermined threshold used to determine a satellite malfunctioning state, the determining unit determines that the GPS satellite is in the malfunctioning state.

3. The apparatus of claim 1, wherein the data correction unit corrects the GPS data by subtracting the clock error value from the GPS data.

4. The apparatus of claim 1, wherein the second computing unit computes the distance R from the geostationary satellite to the GPS satellite according to the following Equation 1:

$$|\vec{R}| = R = \sqrt{(X-x)^2 + (Y-y)^2 + (Z-z)^2} \quad \text{[Equation 1]}$$

where each of X, Y, and Z denotes a position coordinate value of the geostationary satellite, and each of x, y, and z denotes a position coordinate value of the GPS satellite.

5. The apparatus of claim 4, wherein the second computing unit computes the included angle θ between the GPS satellite and the base station based on the geostationary satellite according to the following Equation 3:

$$\cos\theta = \frac{\vec{R}\cdot\vec{r}}{|\vec{R}||\vec{r}|}.$$ [Equation 3]

6. The apparatus of claim 5, wherein the second computing unit computes the geographical distance ρ according to the following Equation 4:

$$\rho = \sqrt{R^2 + r^2 - 2Rr\cos\theta}$$ [Equation 4].

7. The apparatus of claim 6, wherein the first computing unit computes the data pseudorange $\rho_{rec}^{sat}$ according to the following Equation 5:

$$\rho_{rec}^{sat} = c(t_{rec} - t^{sat} + \Delta t)$$ [Equation 5]

where c denotes the velocity of light, $t_{rec}$ denotes an amount of time used for the base station to receive the GPS data, $t^{sat}$ denotes an amount of time used for the GPS satellite to receive the GPS data, and $\Delta t$ denotes a clock error to be corrected.

8. The apparatus of claim 7, wherein when the result obtained by subtracting the data pseudorange from the geographical distance is included in a threshold ρ as expressed by the following Equation 6, the determining unit determines that the GPS satellite is in a normal state:

$$\sigma_{gps} = |\rho - \rho_{rec}^{sat}| < p$$ [Equation 6].

9. The apparatus of claim 8, wherein the determining unit sets the threshold as a maximum error range that includes at least one of an ionosphere error, a convection layer error, and a position error of the geostationary satellite.

10. The apparatus of claim 1, wherein the second computing unit computes the distance r from the geostationary satellite to the base station according to the following Equation 2:

$$|\vec{r}| = r = \sqrt{(X-r_x)^2 + (Y-r_y)^2 + (Z-r_z)^2}$$ [Equation 2]

where each of X, Y, and Z denotes a position coordinate value of the geostationary satellite, and each of $r_x$, $r_y$, and $r_z$ denotes a position coordinate value of a GPS receiver of the base station.

11. A non-transitory, computer-readable media, recording program instructions for executing a method for monitoring a malfunctioning state of a global positioning system (GPS) satellite, the method comprising:
   computing an orbit of a geostationary satellite;
   receiving GPS data from the GPS satellite;
   correcting an error in a clock error value of the GPS data;
   computing a data pseudorange between the GPS satellite and a base station based on the corrected GPS data;
   computing a geographical distance between the GPS satellite and the base station; and
   determining the malfunctioning state of the GPS satellite by comparing the data pseudorange and the geographical distance,
   wherein the geographical distance between the GPS satellite and the base station is calculated using each of:
   a distance R from the geostationary satellite to the GPS satellite,
   a distance r from the geostationary satellite to the base station, and
   an included angle θ between the GPS satellite and the base station based on the geostationary satellite.

12. The method of claim 11, wherein the computing of the geographical distance comprises computing the distance R from the geostationary satellite to the GPS satellite according to the following Equation 7:

$$|\vec{R}| = R = \sqrt{(X-x)^2 + (Y-y)^2 + (Z-z)^2}$$ [Equation 7]

where each of X, Y, and Z denotes a position coordinate value of the geostationary satellite, and each of x, y, and z denotes a position coordinate value of the GPS satellite.

13. The method of claim 12, wherein the computing of the geographical distance comprises computing the included angle θ between the GPS satellite and the base station based on the geostationary satellite according to the following Equation 9:

$$\cos\theta = \frac{\vec{R}\cdot\vec{r}}{|\vec{R}||\vec{r}|}.$$ [Equation 9]

14. The method of claim 13, wherein the computing of the geographical distance comprises computing the geographical distance ρ according to the following Equation 10:

$$\rho = \sqrt{R^2 + r^2 - 2Rr\cos\theta}$$ [Equation 10].

15. The method of claim 14, wherein the computing of the data pseudorange comprises computing the data pseudorange $\rho_{rec}^{sat}$ according to the following Equation 11:

$$\rho_{rec}^{sat} = c(t_{rec} - t^{sat} + \Delta t)$$ [Equation 11]

where c denotes the velocity of light, $t_{rec}$ denotes an amount of time used for the base station to receive the GPS data, $t^{sat}$ denotes an amount of time used for the GPS satellite to receive the GPS data, and $\Delta t$ denotes a clock error to be corrected.

16. The method of claim 15, wherein when the result obtained by subtracting the data pseudorange from the geographical distance is included in a threshold ρ as expressed by the following Equation 12, the determining comprises determining that the GPS satellite is in a normal state:

$$\sigma_{gps} = |\rho - \rho_{rec}^{sat}| < p$$ [Equation 12].

17. The method of claim 11, wherein the computing of the geographical distance comprises computing the distance r from the geostationary satellite to the base station according to the following Equation 9:

$$|\vec{r}| = r = \sqrt{(X-r_x)^2 + (Y-r_y)^2 + (Z-r_z)^2}$$ [Equation 8]

where each of X, Y, and Z denotes a position coordinate value of the geostationary satellite, and each of $r_x$, $r_y$, and $r_z$ denotes a position coordinate value of a GPS receiver of the base station.

* * * * *